(12) United States Patent
Kabir et al.

(10) Patent No.: US 10,696,406 B2
(45) Date of Patent: Jun. 30, 2020

(54) AIRCRAFT AIR PADS HAVING RESTRICTED DEPLOYMENT VOLUMES

(71) Applicant: The Boeing Company, Chicago, IL (US)

(72) Inventors: Mohammed H. Kabir, Mukilteo, WA (US); Alan D. Byar, Issaquah, WA (US); Jan M. Leon, Lynnwood, WA (US); Todd C. DePauw, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 15/980,227

(22) Filed: May 15, 2018

(65) Prior Publication Data

US 2019/0352010 A1    Nov. 21, 2019

(51) Int. Cl.
- *B64D 11/06*  (2006.01)
- *B64D 11/00*  (2006.01)
- *B60R 21/207*  (2006.01)
- *B60R 21/00*  (2006.01)

(52) U.S. Cl.
CPC .. *B64D 11/06205* (2014.12); *B64D 11/00151* (2014.12); *B64D 11/0621* (2014.12); *B60R 21/207* (2013.01); *B60R 2021/0093* (2013.01); *B64D 2201/00* (2013.01)

(58) Field of Classification Search
CPC .......... B64D 11/0621; B64D 11/06205; B64D 2201/00; B60R 21/207; B60R 2021/23153; B60R 2021/0093; B60R 2021/047; B60R 21/04
See application file for complete search history.

(56) References Cited

U.S. PATENT DOCUMENTS

| | | | | |
|---|---|---|---|---|
| 2,418,798 A | * | 4/1947 | Whitmer ................. | B60R 21/16 244/121 |
| 3,370,886 A | * | 2/1968 | Frost ...................... | B60R 21/06 280/730.1 |
| 3,603,535 A | * | 9/1971 | DePolo ................... | B60R 21/16 244/121 |

(Continued)

FOREIGN PATENT DOCUMENTS

| | | | |
|---|---|---|---|
| DE | 10047808 A1 | * 4/2002 | ........... B60R 21/207 |
| DE | 202013004447 U1 | * 8/2013 | |

(Continued)

OTHER PUBLICATIONS

European Search Report; Application EP19174766; dated Sep. 16, 2019.
Airbag; Wikipedia; Mar. 13, 2018.

*Primary Examiner* — Ruth Ilan
(74) *Attorney, Agent, or Firm* — Duft & Bornsen, PC

(57) ABSTRACT

Systems and methods are provided for inflatable air pads for aircraft. One embodiment is an apparatus that includes an air pad affixed to a mount within an interior of an aircraft. The air pad includes a front face, a bladder that is inflatable within the air pad, and sides that constrain the front face of the air pad to extend a uniform distance outward from the mount when the bladder is inflated. The apparatus also includes an inflator that is coupled with the air pad and is configured to inflate the bladder from an undeployed volume to a deployed volume.

20 Claims, 11 Drawing Sheets

(56) References Cited

U.S. PATENT DOCUMENTS

| | | | | |
|---|---|---|---|---|
| 5,649,721 | A * | 7/1997 | Stafford | B60R 21/04 |
| | | | | 244/118.5 |
| 5,902,010 | A * | 5/1999 | Cuevas | B60N 2/914 |
| | | | | 297/216.13 |
| 6,299,209 | B1 * | 10/2001 | Ankersson | B60R 21/2165 |
| | | | | 280/728.3 |
| 6,460,882 | B1 * | 10/2002 | Andres | B60R 21/013 |
| | | | | 280/735 |
| 9,272,680 | B1 * | 3/2016 | Mirzazadeh | B64D 11/0619 |
| 9,428,132 | B2 | 8/2016 | Obadia et al. | |
| 9,527,468 | B2 * | 12/2016 | Vasseur | B60R 21/216 |
| 9,586,552 | B1 * | 3/2017 | Whitens | B60R 21/207 |
| 2013/0009430 | A1 | 1/2013 | Islam et al. | |
| 2013/0154307 | A1 * | 6/2013 | Tamada | B60R 21/04 |
| | | | | 296/187.05 |
| 2013/0341975 | A1 * | 12/2013 | Schneider | B64D 11/06 |
| | | | | 297/163 |
| 2014/0027574 | A1 | 1/2014 | Obadia et al. | |
| 2015/0091281 | A1 * | 4/2015 | Nagasawa | B60N 2/4249 |
| | | | | 280/730.1 |
| 2016/0096627 | A1 | 4/2016 | Gehret et al. | |
| 2017/0225788 | A1 * | 8/2017 | Humbert | B60R 21/18 |

FOREIGN PATENT DOCUMENTS

| | | | | |
|---|---|---|---|---|
| EP | 0291554 A1 * | 11/1988 | | B60R 21/207 |
| JP | 57058533 A * | 4/1982 | | |
| JP | 11180398 A * | 7/1999 | | |

\* cited by examiner

AIRCRAFT AIR PADS HAVING RESTRICTED DEPLOYMENT VOLUMES

FIELD

The disclosure relates to the field of aircraft, and in particular, to passenger safety systems for aircraft.

BACKGROUND

Aircraft utilize a wide variety of systems and devices to provide comfort and safety for passengers. For example, passive safety systems such as seatbelts retain passengers in their seats during a rapid deceleration event.

Even though many safety systems used on passenger aircraft are viable, certain types of safety systems remain untenable. For example, safety devices that are provided to individual passengers may need to fit within the amount of space reserved for each passenger. Hence, bulky or unwieldy safety systems may not be feasible. Furthermore, even systems which would be compact when installed may cause problems after they have been deployed during a rapid deceleration event. For example, air bags may increase in volume by a factor of hundreds or thousands of times during deployment, and air bags therefore leave large hanging swaths of fabric after deployment. These swaths of fabric may interfere with the degree of passenger egress required by Federal Aviation Administration (FAA) standards. Thus, while air bags remain common in automotive transportation, they are infeasible for aircraft.

Therefore, it would be desirable to have a method and apparatus that take into account at least some of the issues discussed above, as well as other possible issues.

SUMMARY

Embodiments described herein provide air pads that inflate by limited amounts during deployment, and may have shapes that are constrained during and after deployment in order to facilitate passenger egress. For example, some air pads described herein may increase to no more than ten times their undeployed volume after they have been deployed, or may extend no more than a few inches outward during deployment. This allows the air pads to enhance passenger safety during a rapid deceleration event (e.g., by reducing a magnitude of deceleration experienced by passengers during a period of time), while still enabling passenger egress from a seat after the rapid deceleration event has occurred.

One embodiment is an apparatus that includes an air pad affixed to a mount within an interior of an aircraft. The air pad includes a front face, a bladder that is inflatable within the air pad, and sides that constrain the front face of the air pad to extend a uniform distance outward from the mount when the bladder is inflated. The apparatus also includes an inflator that is coupled with the air pad and is configured to inflate the bladder from an undeployed volume to a deployed volume.

A further embodiment is a system that includes an air pad affixed to a mount within an interior of an aircraft. The air pad includes a front face, a bladder that is inflatable within the air pad, and sides that constrain the front face of the air pad to extend a uniform distance outward from the mount when the bladder is inflated. The system also includes an inflator that is coupled with the air pad and is configured to inflate the bladder from an undeployed volume to a deployed volume, a sensor that determines a deceleration of the aircraft, and a controller that receives input from the sensor indicating the deceleration of the aircraft, determines that the deceleration of the aircraft has exceeded a threshold value for longer than a period of time, and triggers the inflator for the air pad to deploy the air pad.

A further embodiment is a method that includes receiving input from a sensor indicating a deceleration of an aircraft, determining that the deceleration of the aircraft has exceeded a threshold value for longer than a period of time, triggering an inflator for an air pad that is mounted within an interior of the aircraft and includes a bladder as well as sides of flexible material that constrain a front face of the air pad to extend a uniform distance outward when the bladder is inflated, and deploying the bladder by inflating the bladder.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
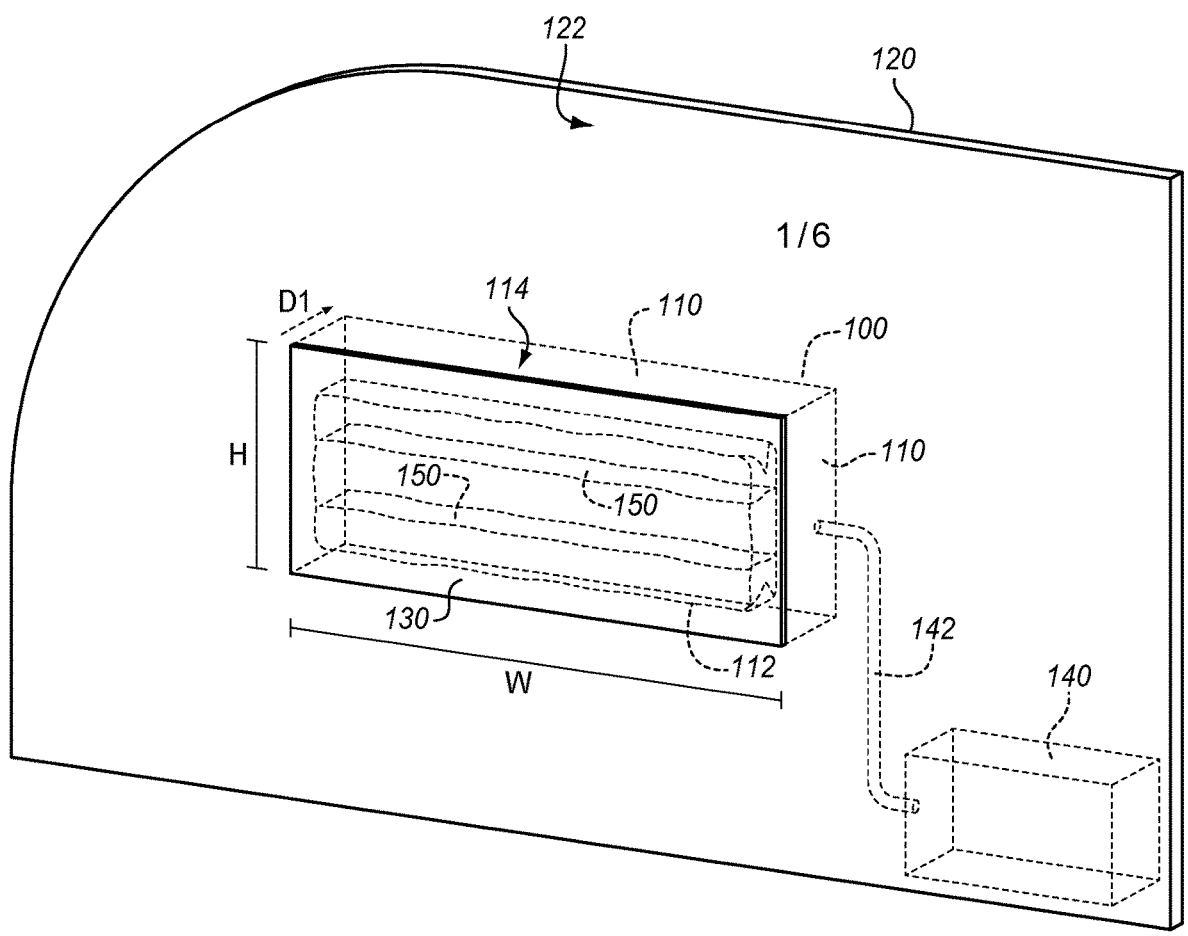
FIGS. 1-2 are perspective views of an air pad mounted within an aircraft in an illustrative embodiment.
Figure 2:
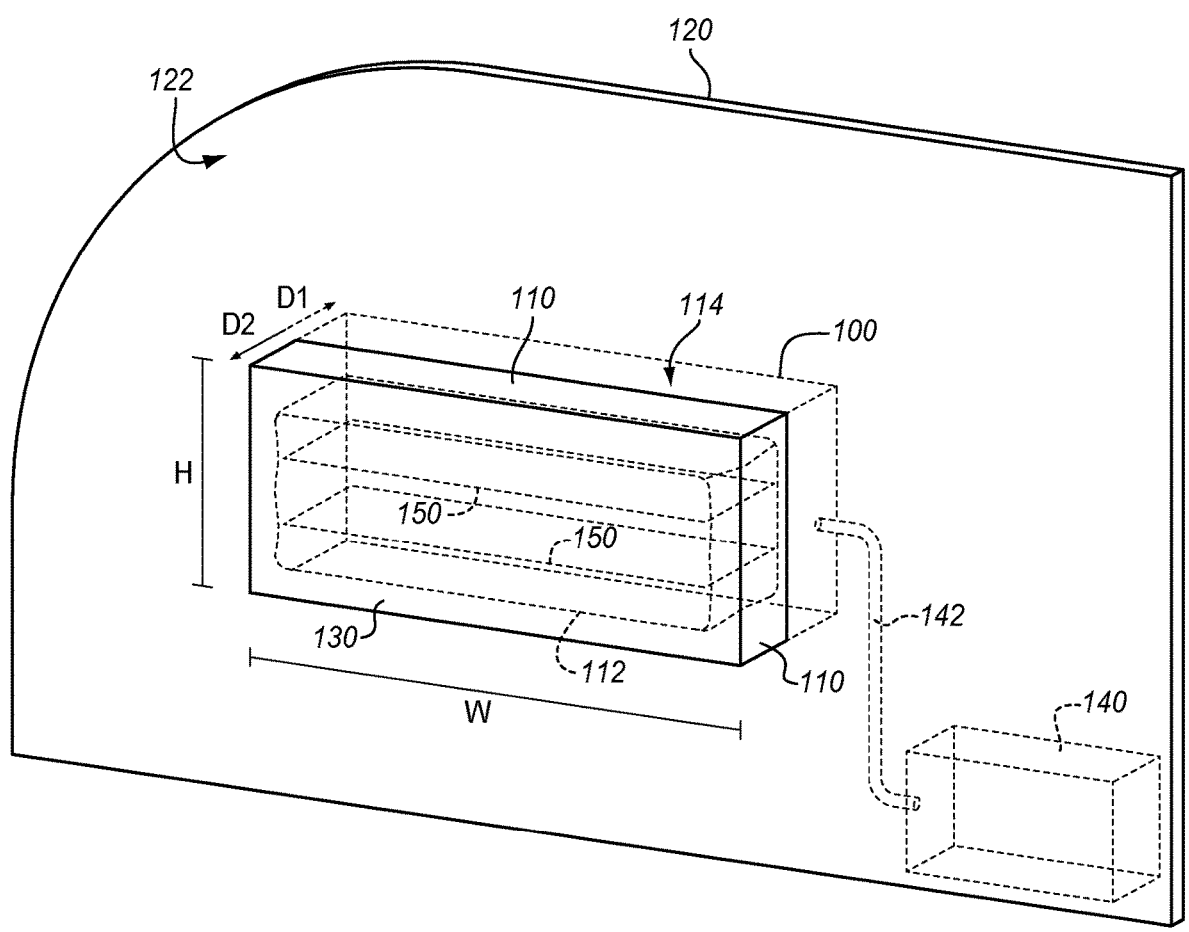

FIGS. 1-2 are perspective views of an air pad 100 mounted within an aircraft in an illustrative embodiment. Air pad 100 comprises any system or device within an aircraft that is configured to deploy via inflation to enhance safety during a rapid deceleration event. In this embodiment, air pad 100 is affixed to a mount 120 of an aircraft. Air pad 100 may be affixed such that a front of the air pad 100 (e.g., front face 130 of air pad 100) that will extend outward from mount 120 during deployment is flush or substantially flush with surface 122 of mount 120 before deployment. This means that air pad 100 does not noticeably protrude from surface 122 prior to deployment. As used herein, a mount is any suitable surface or component to which an air pad 100 may be affixed or housed within. While only one air pad 100 is illustrated in FIGS. 1-2, in further embodiments an air pad may cover any dimensions in a bulkhead (or seat back), including the entire width and/or height of such elements. There may even be multiple air pads within each bulkhead (e.g., three air pads across the width of a bulkhead) having either a shared or independent sensor and inflator.

Air pad 100 includes bladder 112 as well as sides 110 of fabric 114. Front face 130 of air pad 100 is supported by sides 110 of fabric 114. Sides 110 also surround bladder 112. When bladder 112 is inflated, it increases the volume of air pad 100 and causes air pad 100 to expand outward. During and after inflation of bladder 112, sides 110 and/or tethers 150 cause the air pad 100 to be constrained into a desired shape. This is because sides 110 and tethers 150 are secured to both mount 120 and front face 130.

Bladder 112 is made from any suitable type of material, such as a fabric that is impermeable to gas on a time scale of deployment (e.g., over a period of ten milliseconds). Hence, even though the fabric may leak gas over a period of seconds, minutes, hours, or days, it may remain effectively impermeable to gas during a rapid deceleration event. In one embodiment, bladder 112 is made from a gas impermeable material (e.g., polyester fabric, nylon, etc.) having a thickness between one quarter and one half of an inch.

Bladder 112 is inflated via pressurized gas provided by inflator 140 via tubing 142. In the undeployed state shown in FIG. 1, bladder 112 is uninflated and air pad 100 has a height H, a width W, and extends a depth D1 into mount 120. These dimensions define the "undeployed volume" of air pad 100. This undeployed volume includes space occupied by fabric that defines boundaries/sides of bladder 112.

In FIG. 2, bladder 112 has been inflated. The increase in volume of bladder 112 causes air pad 100 to expand. This pushes front face 130 of air pad 100 outward to project a uniform distance D2 from surface 122 of mount 120. As used herein, a distance of projection of front face 130 is "uniform" if a majority of locations on front face 130 (e.g., eighty percent) have distances of projection from surface 122 that vary by less than a threshold amount (e.g., twenty percent). This characteristic causes the front face 130 to remain substantially planar during and/or after deployment, even though a slight curvature may be exhibited at the edges of air pad 100.

As shown in FIG. 2, tethers 150 constrain the shape of bladder 112 during deployment and keep front face 130 substantially planar. Tethers 150 may be made from the same fabric as sides 110 or bladder 112, or may be made from a different material. For example, tethers 150 may be made from a non-stretch, non-flexible material that is permeable to gas, or may include gaps or holes that enable gas to pass through them and provide even inflation of bladder 112.

Inflator 140 is configured to deploy the air pad 100 in a suitable time period (e.g., less than ten milliseconds, such as less than one or two milliseconds), and may comprise a chemical inflator loaded with propellant, or other suitable device that inflates air pad 100 to a deployed volume that is between two and ten times its undeployed volume. For example, inflator 140 may inflate air pad 100 to a thickness of one to two inches outwards from a seat when air pad 100 is mounted to a seat, or may inflate air pad 100 to a thickness of two to four inches outward when air pad 100 is placed at a monument of an aircraft. Inflator 140 may further inflate air pad 100 to a total volume of several hundred cubic inches (e.g., two hundred cubic inches) when used for a seat, or several thousand cubic inches when used at a monument to protect an entire row of passengers.

Figure 3:
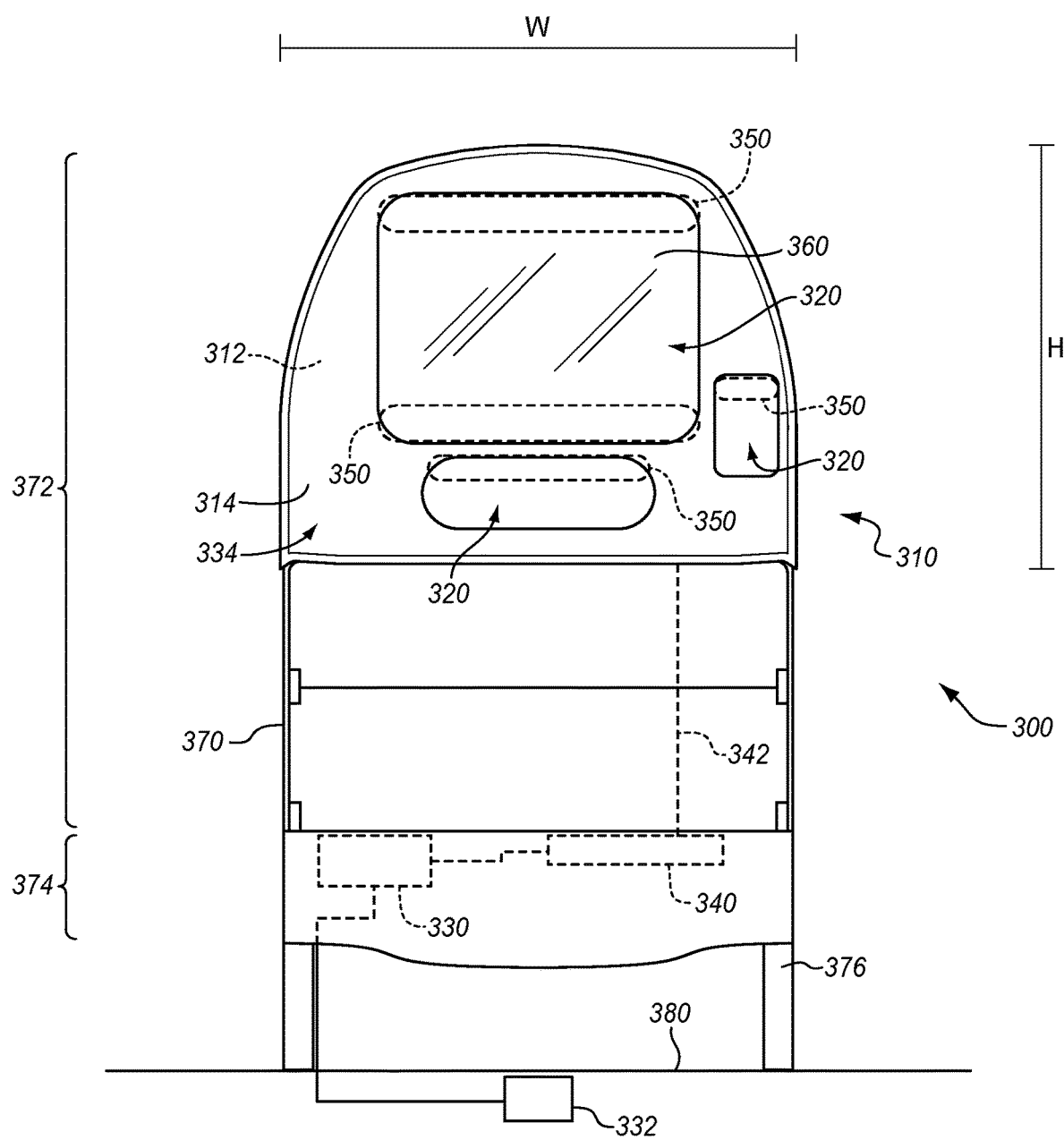
FIGS. 3-4 are front views of an air pad deployment system housed at a passenger seat in an illustrative embodiment.
Figure 4:
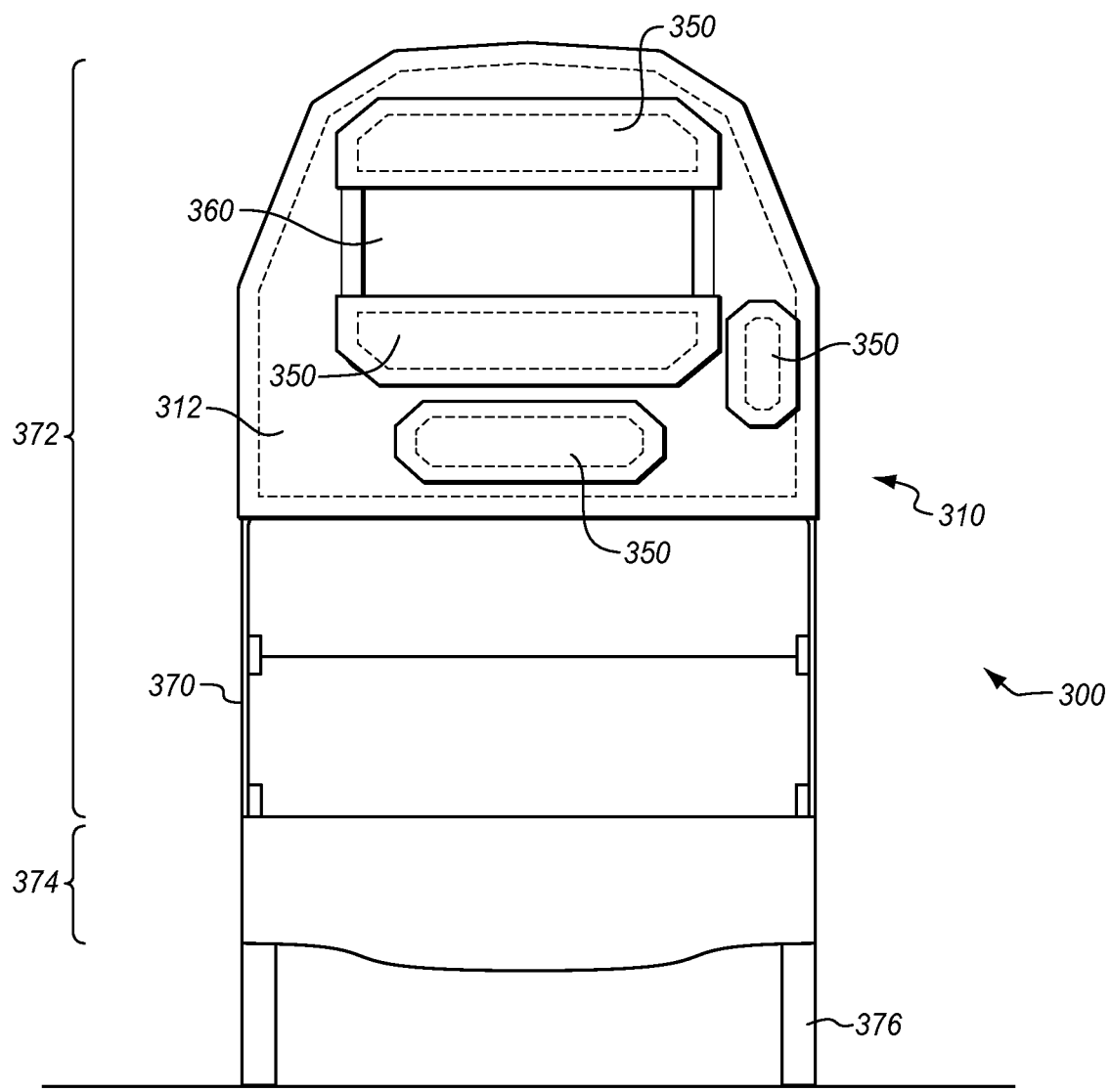

FIGS. 3-4 provide details of an air pad deployment system 300 housed at a seat 370 for a passenger in an illustrative embodiment. Seat 370 includes seat back 372 and base 374, which are structurally united and secured to the aircraft via frame 376. According to FIG. 3, air pad deployment system 300 includes air pad 310. Air pad 310 is configured to mount at seat back 372 and includes bladder 312, which inflates during deployment to enhance passenger safety. Air pad 310 is positioned at a location where a head of a passenger is expected to contact a portion of the aircraft during a rapid deceleration event. The location of air pad 310 may be chosen based on known statistical and/or biometric data indicating the range of locations that a large percentage of passengers' heads would be likely to contact.

Bladder 312 has been enhanced to inflate a limited amount to displace front face 314 a uniform distance outward during deployment (e.g., one to four inches). This limited degree of inflation for bladder 312 deploys the air pad 310 in a manner that provides protection without interfering with passenger egress.

Air pad 310 is shaped in the form of seat back 172. This conformity of shape between air pad 310 and seat 370 preserves the aesthetics or seat 370. Seat back 372 includes a number of components such as display 360, a charging port, and a credit card terminal. It is desirable for these components to remain accessible to passengers during flight so that the passengers may view content on display 360 or otherwise enjoy the in-flight experience. Air pad 310 has been designed with a shape that does not interfere with a passenger's use of these features, because air pad 310 includes gaps 320 (e.g., cut-outs or holes) that are positioned at the locations of components within the seat 370. The gaps 320 enable a passenger to access the components of seat back 372 during flight.

Additional bladders 350 may be located at the edges of gaps 320. These additional bladders 350 may cover or fill gaps 320 during deployment. One of gaps 320 in air pad 310 is located at a display 360 mounted in seat 370, and two of the additional bladders 350 are located proximate to display 360, such as underneath a plastic shroud. These additional bladders 350 may eject the plastic shroud and inflate around display 360 in order to cover display 360 during a rapid deceleration event. In this manner, additional bladders 350 prevent a passenger from directly contacting display 360 during the rapid deceleration event.

Bladders within air pad 310 are coupled with inflator 340 via tubing 342. Inflator 340 activates in response to input from controller 330, which utilizes input from sensor 332 (e.g., an accelerometer located within or below a floor panel 380 of the aircraft) in order to determine whether a rapid deceleration event is occurring. For example, controller 330 may determine that a rapid deceleration event is occurring if sensor 332 reports a deceleration of greater than sixteen gravities (G's) over a period of less than one millisecond (e.g., half of a millisecond). Controller 330 may be implemented as a hardware processor implementing instructions stored in a memory, as specialized circuitry, etc.

Figure 5:
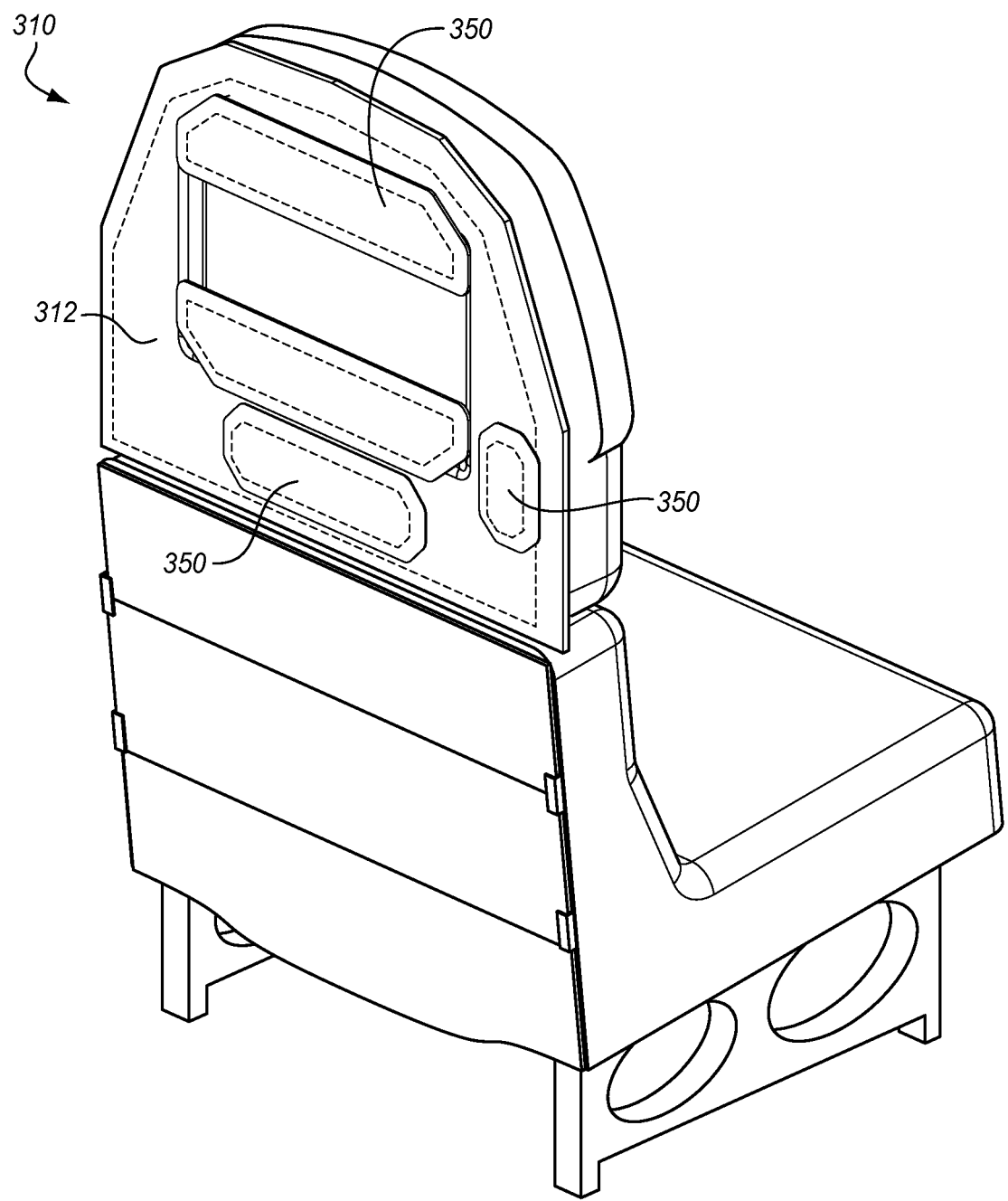
FIG. 5 is a perspective view of a deployed air pad housed in a passenger seat in an illustrative embodiment.

In FIG. 4, air pad 310 has been deployed, which means that bladders within air pad 310 have been inflated to cover previously exposed portions of seat 370. Air pad 310 and/or additional bladders 350 may be specifically designed to cover or inflate around the seat 370 and/or the display 360 (e.g., around edges or corners of display 360) in order to cushion a passenger that will contact seat back 372 during a rapid deceleration event. The perspective view provided in FIG. 5 illustrates that after deployment, air pad 310 has expanded outward to exhibit a thickness, such as a thickness of one to several inches, as discussed above.

Illustrative details of the operation of air pad deployment system 300 will be discussed with regard to FIG. 6. Assume, for this embodiment, that an aircraft has initiated a rapid deceleration event that will result in deployment of air pads 310 at seats 370 in order to enhance passenger safety. Thus, while method 600 is described with regard to air pad 310, a person of ordinary skill in the art will appreciate that method 600 may be performed at each air pad deployment system 300 within the aircraft at the same time.

Figure 6:
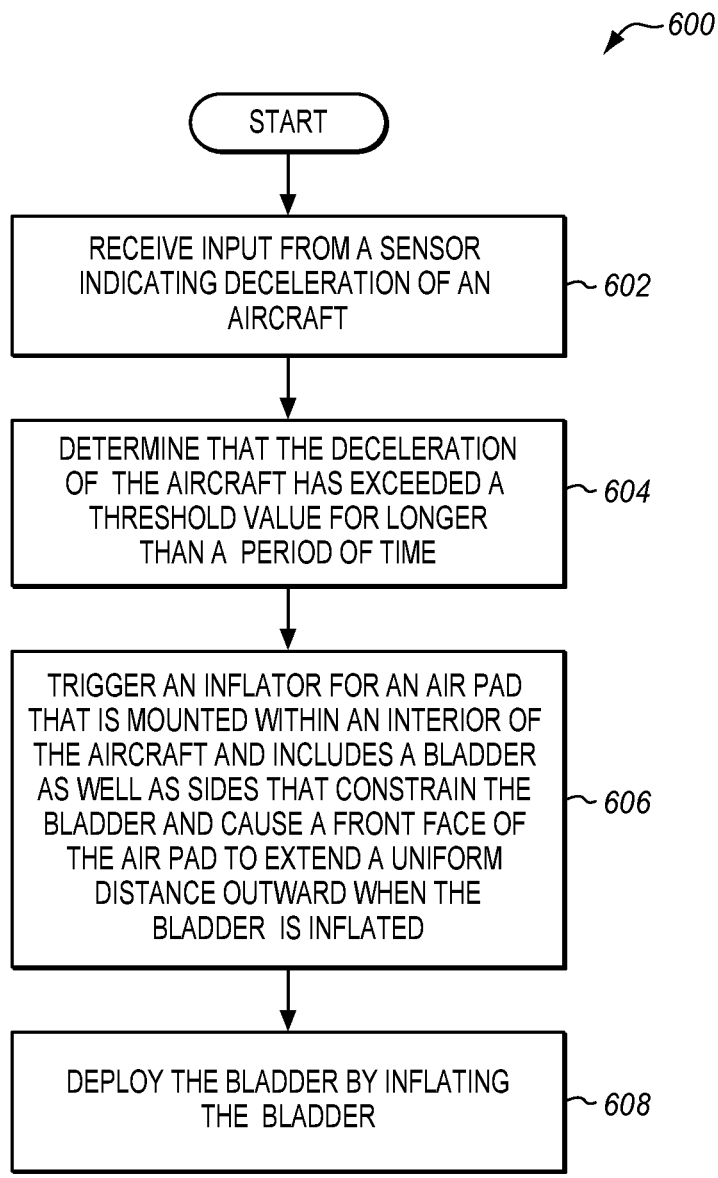
FIG. 6 is a flowchart illustrating a method for operating an air pad deployment system in an illustrative embodiment.

FIG. 6 is a flowchart illustrating a method 600 for operating an air pad deployment system in an illustrative embodiment. The steps of method 600 are described with reference to air pad deployment system 300 of FIG. 3, but those skilled in the art will appreciate that method 600 may be performed in other systems as desired. The steps of the flowcharts described herein are not all inclusive and may include other steps not shown. The steps described herein may also be performed in an alternative order.

According to FIG. 6, method 600 includes receiving input from sensor 332 indicating deceleration of the aircraft (step 602). For example, this sensor input may comprise a stream of deceleration values which are received and processed by controller 330 over time (e.g., at a rate of thousands or tens of thousands of times per second). Controller 330 may store these deceleration values in memory and average them via a moving window or other suitable process in order to determine the average deceleration encountered over a period of time (e.g., less than ten milliseconds, such as a period of one millisecond). As used herein, "acceleration" refers to changes in speed in any suitable direction, including forwards and/or backwards. Hence, while deceleration of the aircraft is tracked via sensor 332, input from sensor 332 may be more generally referred to as measuring "acceleration."

Based on the incoming sensor input, controller 330 determines that the deceleration of the aircraft has exceeded a threshold value for longer than a period of time (step 604). For example, controller 330 may determine that each value of sensor input over the period of time (e.g., the last millisecond) has exceeded the threshold value, or may determine that the average value (e.g., arithmetic mean) of sensor input over the period of time has exceeded the threshold value. The threshold value may be measured in G's, and may for example by sixteen G's, or nine G's. The period of time may be a period of time immediately prior to the current time, such as the prior ten milliseconds, the prior millisecond, the prior half-millisecond, etc.

Having determined that the aircraft has exceeded the threshold value of deceleration for the period of time, controller 330 concludes that a rapid deceleration event is occurring. In order to enhance passenger safety during the rapid deceleration event, controller 330 takes steps to initiate deployment of its air pad 310. To this end, controller 330 triggers the inflator 340 for bladder 312 (step 606). Controller 330 may trigger inflator 340 by triggering a component within inflator 340 that will cause rapid expansion of gas into bladder 312 and/or additional bladders 350.

In response to being triggered, inflator 340 forces gas via tubing 342 into air pad 310 to fill bladder 312 and/or any additional bladders 350. This action deploys the bladder 312 of air pad 310 by inflating bladder 312 (step 608). Bladder 312 is surrounded by sides of flexible material (e.g., fabric 314) that constrain the front face 130 of air pad 310 to extend a uniform distance outward when bladder 312 is inflated. This means that during inflation, bladder 312 expands into a shape defined by the sides. Bladder 312 may inflate to a deployed volume that is between two and ten times the size of the undeployed volume in less than ten milliseconds (e.g., less than two milliseconds), may inflate to a consistent maximum thickness of one to four inches, etc.

The rapid deployment of the air pad 310 makes it so that that air pad 310 is fully inflated before a passenger will contact seat 370. This means that air pad 310 (instead of seat 370, or display 360) receives kinetic energy from the passenger. Kinetic energy from the passenger is therefore transferred to the air pad 310 to result in deformation of the air pad 310. This increases the amount of time during which the passenger decelerates, which reduces the peak G's experienced by the passenger during deceleration. In short, the duration of deceleration is increased while the amount of deceleration remains the same, which reduces the peak G's.

Figure 7:
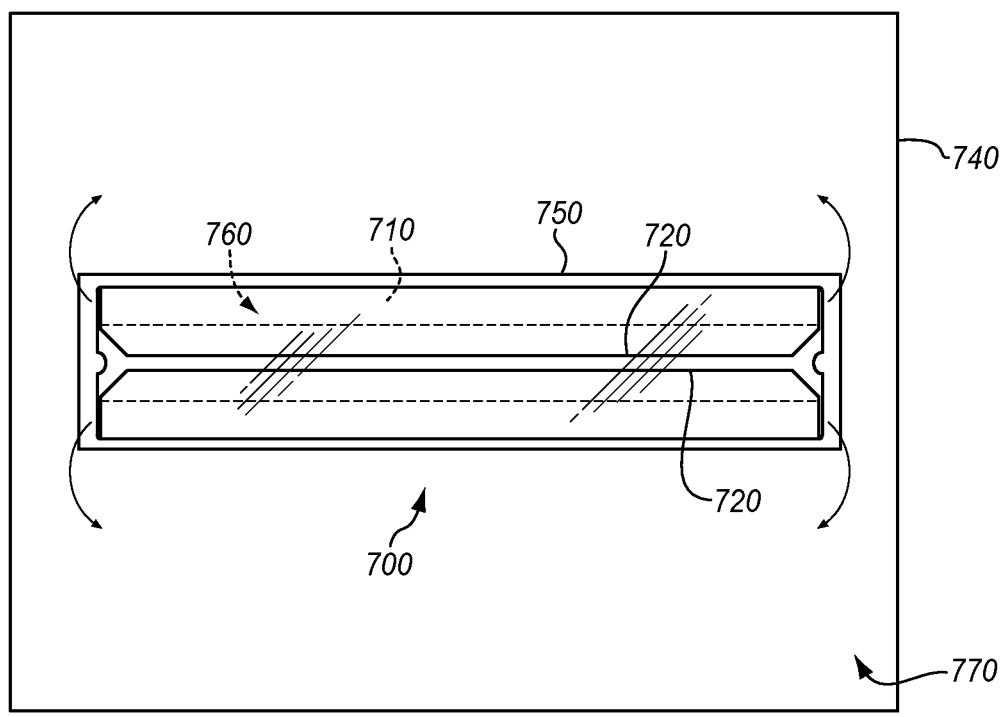
FIGS. 7-10 are perspective views of air pads mounted at a monument in an illustrative embodiment.
Figure 8:
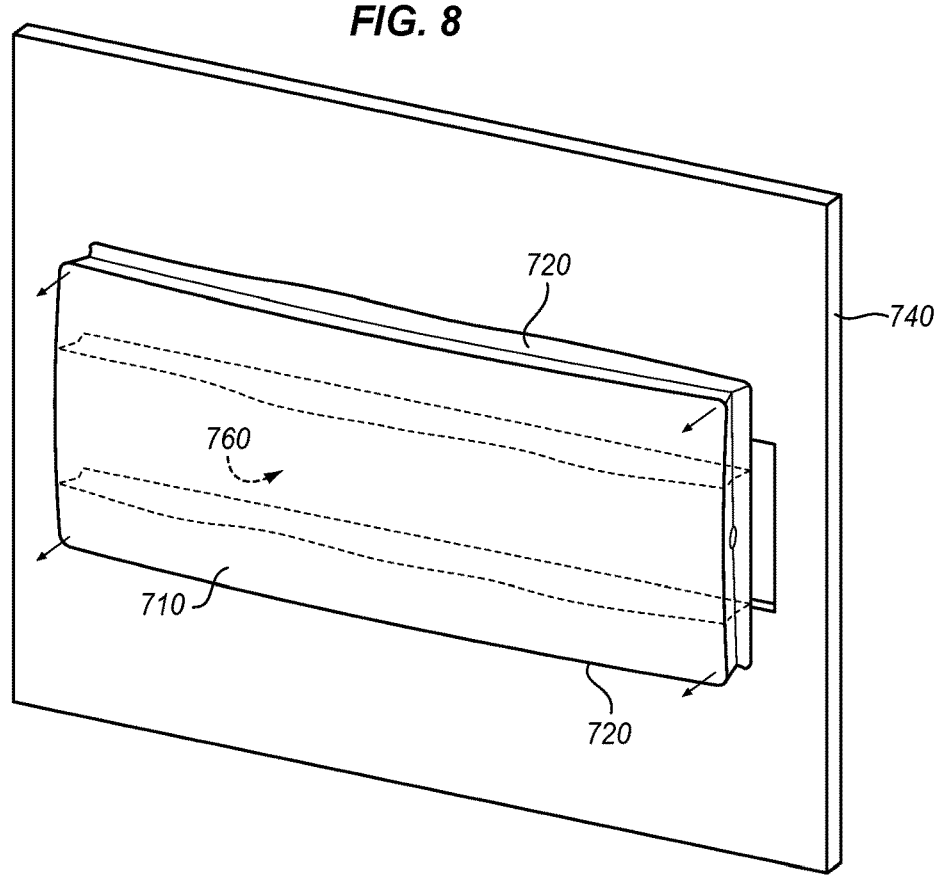
Figure 9:
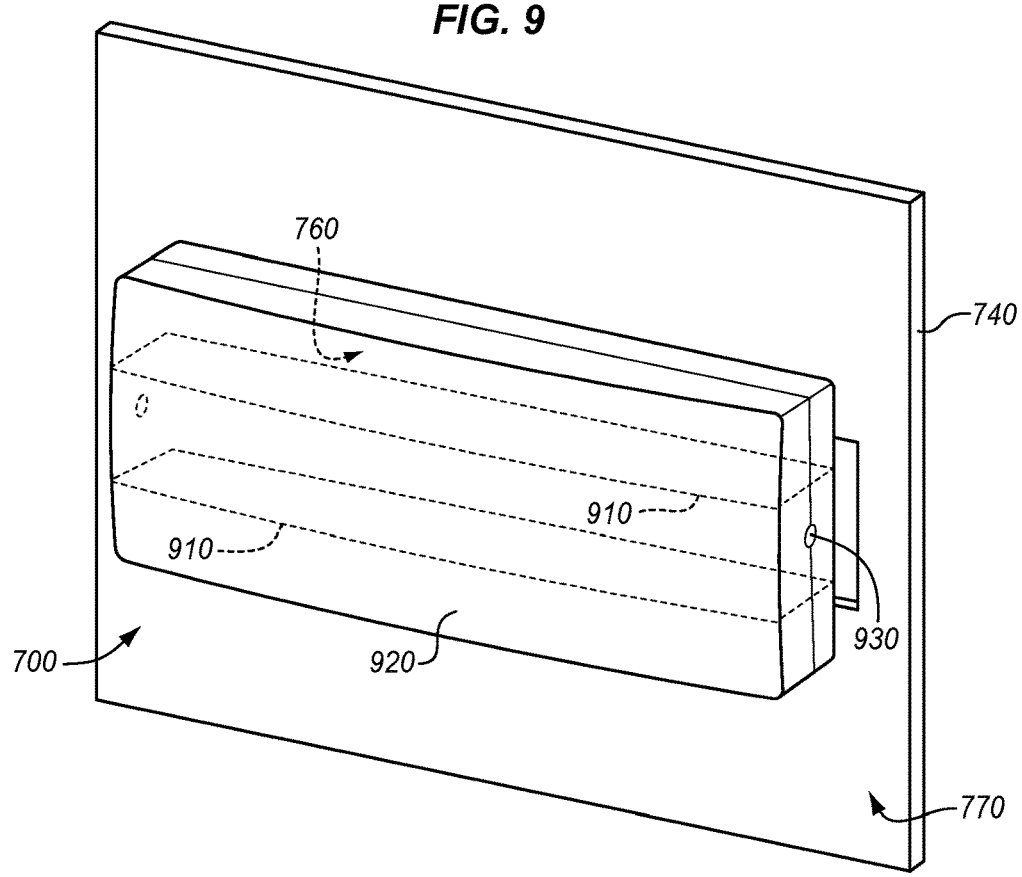

FIGS. 7-9 are views of an air pad 700 mounted at a monument 740 in an illustrative embodiment. FIG. 7 is a front view of air pad 700 mounted at monument 740. According to FIG. 7, bladder 760 of air pad 700 is positioned behind a cover (e.g., a break-away panel, fabric cover, etc.) 750 at surface 770 of monument 740. During inflation of bladder 760 within air pad 700, flaps 720 of air pad 700 fold outward, exposing front face 710 of air pad 700.

FIG. 8 is a perspective view of air pad 700 wherein bladder 760 within air pad 700 is partially inflated. According to FIG. 8, flaps 720 of air pad 700 have folded outward to expose the front face 710. Air pad 700 will continue to expand outward from monument 740 as gas continues to flow into bladder 760 within air pad 700. In FIG. 9, air pad 700 is fully inflated. FIG. 9 illustrates air pad 700 in a fully inflated state. FIG. 9 shows sides 920 which surround bladder 760, and tethers 910 within the bladder 760 which support the sides 920 and maintain a uniform projection distance of front face 710 from surface 770. That is, tethers 910 constrain the shape of bladder 760 during deployment and may keep a face of air pad 700 substantially planar, such that the face of air pad 700 extends a uniform distance out from monument 740.

Figure 10:
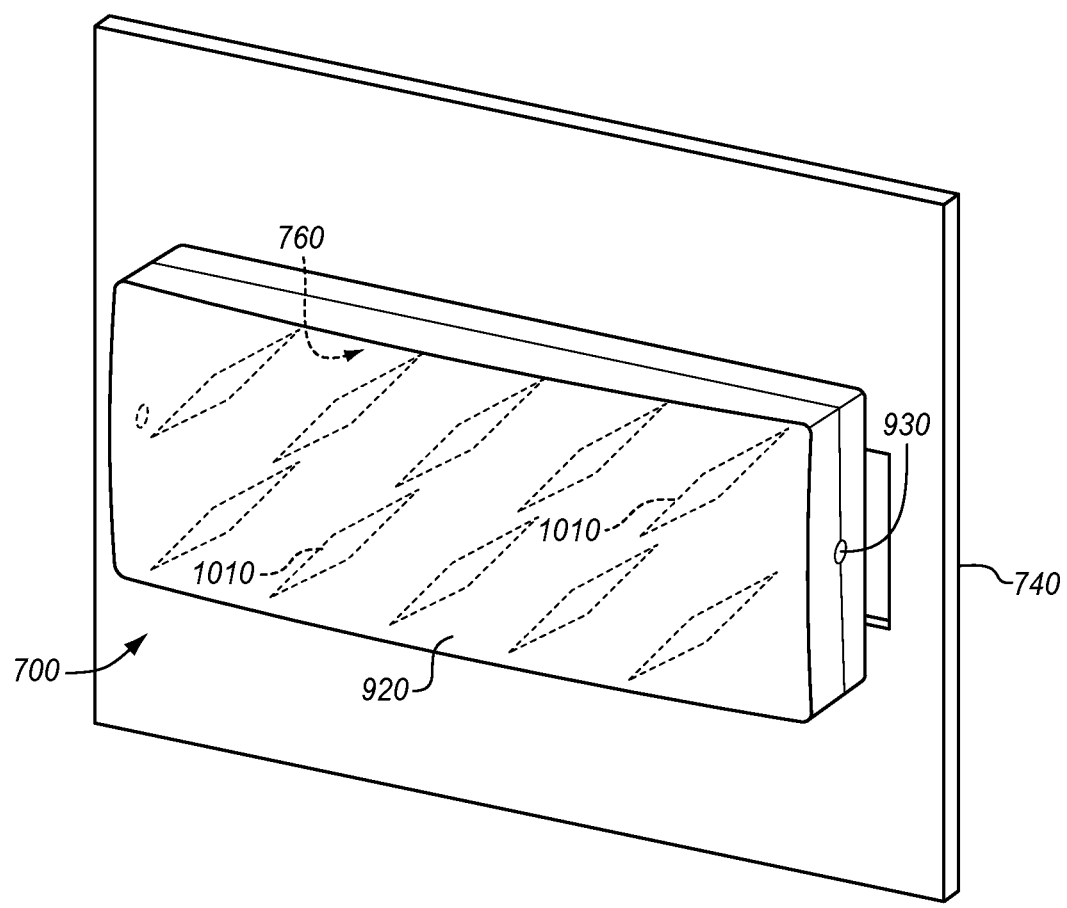

Tethers 910 may be made from the same fabric as sides 920, or may be made from a different material. For example, tethers 910 may be made from a non-stretch, non-flexible material that is permeable to gas, or may include gaps or holes that enable gas to pass through them and provide even inflation of air pad 700. Vent holes 930 are also depicted which enable gas to exit the air pad 700 after the rapid deceleration event has concluded. For example, air may exit the vent holes 930 after a passenger contacts the air pad 700. FIG. 10 illustrates a further embodiment wherein tethers 1010 are implemented as discrete linear elements within air pad 700 that extend outward from surface 770 towards front face 710.

Figure 11:
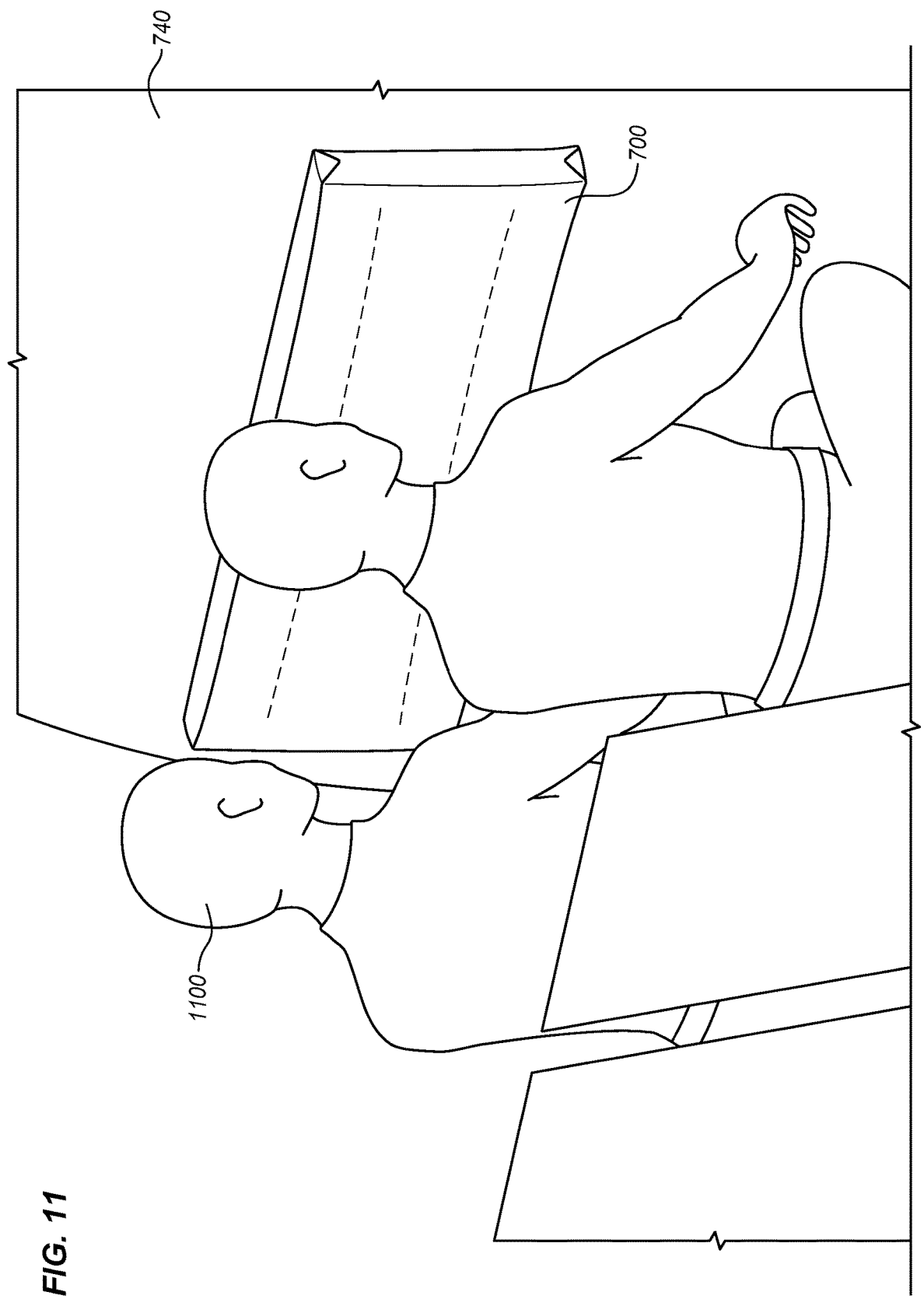
FIGS. 11-12 are perspective views of an air pad absorbing kinetic energy from passengers in an illustrative embodiment.
Figure 12:
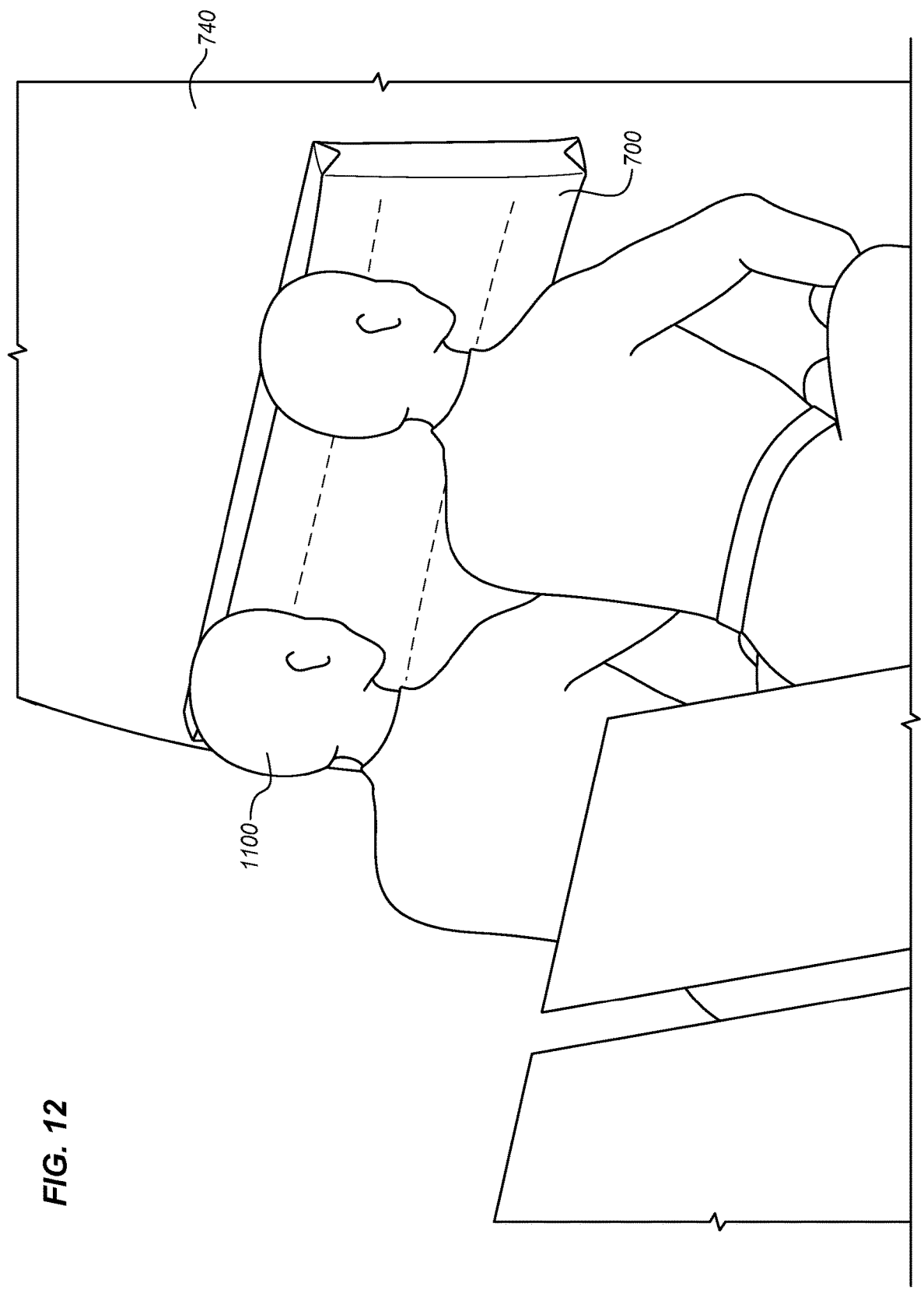

FIGS. 11-12 are perspective views of an air pad 700 absorbing kinetic energy from passengers 1100 in an illustrative embodiment. As shown in FIG. 11, air pad 700 is positioned on monument 740 in a location where a passenger 1100 may be expected to contact monument 740 during a rapid deceleration event. Air pad 700 may deform upon contact with a passenger 1100 in order to absorb kinetic energy and reduce the intensity of deceleration experienced by the passenger 1100.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus comprising:
an air pad affixed to a mount within an interior of an aircraft, wherein the air pad includes a gap at a location of a component installed in a seat back of the aircraft, the air pad comprising:
a front face;
a bladder that is inflatable and constrained to extend a uniform distance outward from the mount when the bladder is inflated; and
an inflator that is coupled with the air pad and is configured to inflate the bladder from an undeployed volume to a deployed volume.

2. The apparatus of claim 1 wherein:
a maximum amount of the uniform distance during inflation of the bladder is between one and four inches.

3. The apparatus of claim 1 wherein:
the air pad is shaped in a form of the seat back of the aircraft.

4. The apparatus of claim 1 wherein:
the air pad is mounted to a seat back of the aircraft.

5. The apparatus of claim 1 wherein:
the air pad further comprises an additional bladder at an edge of the gap which is inflated by the inflator and expands into the gap during deployment.

6. The apparatus of claim 5 further comprising:
a gap at a location of a display installed in the seat back, wherein the air pad further comprises an additional bladder that covers the display during deployment of the air pad.

7. The apparatus of claim 1 wherein:
the bladder covers a portion of the seat back during deployment that is exposed prior to deployment.

8. The apparatus of claim 1 wherein:
the bladder inflates around corners of a display.

9. A system comprising:
an air pad affixed to a mount within an interior of an aircraft, wherein the air pad includes a gap at a location of a component installed in a seat back of the aircraft, the air pad comprising:
a front face;
a bladder that is constrained to to extend a uniform distance outward from the mount when the bladder is inflated;
an inflator that is coupled with the air pad and is configured to inflate the bladder from an undeployed volume to a deployed volume;
a sensor that determines a deceleration of the aircraft; and
a controller that receives input from the sensor indicating the deceleration of the aircraft, determines that the deceleration of the aircraft has exceeded a threshold value for longer than a period of time, and triggers the inflator for the air pad to deploy the air pad.

10. The system of claim 9 wherein:
a maximum amount of the uniform distance during inflation of the bladder is between one and four inches.

11. The system of claim 9 wherein:
the air pad is shaped in a form of the seat back of the aircraft.

12. The system of claim 9 wherein:
the air pad is mounted to a seat back of an aircraft.

13. The system of claim 9 wherein:
the air pad further comprises an additional bladder at an edge of the gap which is inflated by the inflator and that covers the gap during deployment.

14. The system of claim 13 further comprising:
a gap at a location of a display installed in the seat back, wherein the air pad further comprises an additional bladder that covers the display during deployment of the air pad.

15. The system of claim 9 wherein:
the bladder covers a portion of the seat back during deployment that is exposed prior to deployment.

16. The system of claim 9 wherein:
the bladder inflates around corners of a display.

17. A method comprising:
receiving input from a sensor indicating a deceleration of an aircraft;
determining that the deceleration of the aircraft has exceeded a threshold value for longer than a period of time;
triggering an inflator for an air pad that is mounted within an interior of the aircraft and includes a bladder that is constrained to extend a uniform distance outward when the bladder is inflated, wherein the air pad includes a gap at a location of a component installed in a seat back of the aircraft; and
deploying the bladder by inflating the bladder.

18. The method of claim 17 wherein:
the threshold value is sixteen Gravities (G's), and the period of time is two milliseconds.

19. The method of claim 17 wherein:
the bladder covers a portion of the seat back during deployment that is exposed prior to deployment.

20. The method of claim 17 wherein:
the bladder inflates around corners of a display during deployment.

\* \* \* \* \*